March 28, 1944.  H. SCOTT-PAINE  2,345,504
MOUNTING FOR GUNS OR SIMILAR APPARATUS
Filed Dec. 11, 1941
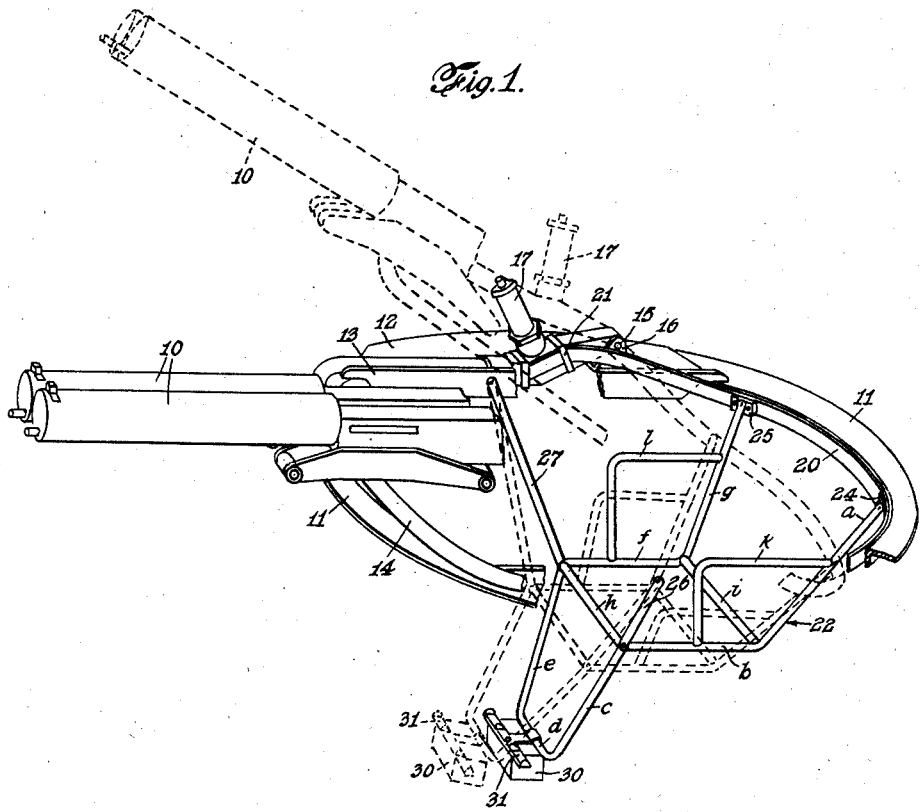
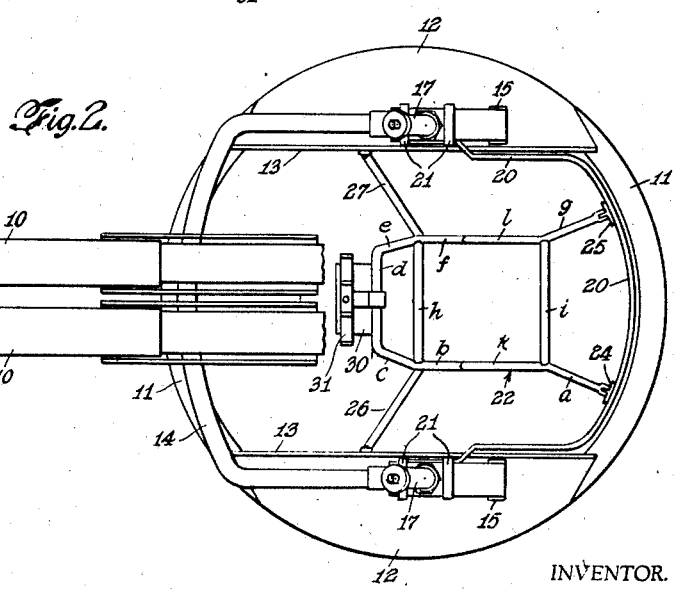
INVENTOR.
Hubert Scott-Paine
BY Williams, Rich & Morse
ATTORNEYS.

Patented Mar. 28, 1944

2,345,504

UNITED STATES PATENT OFFICE 2,345,504

MOUNTING FOR GUNS OR SIMILAR APPARATUS

Hubert Scott-Paine, Greenwich, Conn.

Application December 11, 1941, Serial No. 422,470

3 Claims. (Cl. 89—37.5)

This invention relates to flexible mountings for apparatus which is to be sighted or aimed by an operator and more particularly to the seat or support for the operator of such devices.

A variety of gun-turrets, gun-rings or mountings for machine guns and other rapid-firing guns are known, the object of which is to traverse and elevate the gun or guns in aiming at targets. Such apparatus is adapted to be mounted in aircraft, on shipboard or in other vehicles and is designed to be highly manoeuverable so that the guns may be rapidly swung horizontally and elevated vertically. The traversing and elevating may be accomplished manually by the operator or by power-driven devices under the control of the operator.

Although the present invention is applicable to such mountings for guns it is equally adaptable for use in mountings for other kinds of apparatus which has to be sighted, such as cameras for either still or motion pictures.

In order to promote the accuracy of sighting or aiming it is desirable that the operator or gunner shall be securely supported in a comfortable position behind his sights, in a position which is relatively fixed in relation to the sights, so that he is not put under any unnecessary strain.

It is the principal object of the invention to provide a seat or support for the gunner or operator which follows the movements of the apparatus sighted, both horizontal and vertical. Another object is to so mount the seat that the weight of the operator is utilized to counterbalance the weight of said apparatus. A further object is to provide the seat with foot-operated controls for the rotary motion of the mounting as a whole. Other objects and advantages will appear in the course of the following description of an embodiment of the invention, taken in conjunction with the drawing in which, Fig. 1 is a perspective view, with some parts broken away, of a power-driven gun ring containing the novel features of the present invention;

Fig. 2 is a plan view corresponding to Fig. 1.

Referring to the drawing, a power driven mounting for a pair of machine guns 10 is shown. The guns may of course be replaced by any other apparatus to be sighted, such as a camera. The mounting comprises a framework including a circular ring 11, which is supported on bearings in any suitable manner for horizontal rotation, to which ring are affixed, on either side, the platforms 12 which abut the side bars 13. The space within this framework serves as a cockpit within which the operator or gunner sits.

Rotation of the framework is brought about by any desired motive power, such as pneumatic, hydraulic or electrical, various types of driving mechanism being well known but not here described as, per se, they form no part of the present invention.

The guns 10 are mounted so as to be supported, at least in part, and elevated by an elevating member or arch 14, which extends around the fore part of the cockpit. This arch is pivoted for vertical movement on either side of the cockpit, in bearings 15 supported from the platforms 12 by any suitable brackets such as 16. Movement of the arch 14 about pivots 15 elevates the guns as shown in broken lines in Fig. 1. Elevation may be effected in known manner by pistons operating in the cylinders 17 mounted on the arch, the connecting-rods attached to the pistons being pivotally secured to the platforms 12. Mechanism under the control of the operator and usually governed by manipulation of the guns controls the flow of fluid into the cylinders 17 and consequent elevation of the arch 14.

It is apparent, therefore, that the guns 10 may be aimed in any desired direction by the combined rotation of the framework in a horizontal plane and the vertical movement of the arch 14. According to the invention, a seat is provided for the gunner which so positions him as to keep him automatically behind his sights in all positions of the guns. To this end a back-bar 20 is attached to the arch 14, as shown at 21, so that it extends around the rear part of the cockpit. As the arch 14 is elevated, the back-bar 20 is depressed, as shown in broken lines in Fig. 1. This back-bar 20 forms part of the support for a chair or seat, generally indicated by 22.

The chair 22 may be formed of welded tubing to which may be attached covering for the seat and back of any desired material, such as sheet metal or fabric, for the support of the operator. A very rigid and practicable structure may be made by bending a single tubing into the sections a, b, c, d, e, f and g which are then joined by cross braces h and i. Arms k and l may be added if desired.

The sections a and g of chair 22 form its back and also serve as supports for the rear part of the seat, being pivotally suspended from the brackets 24 and 25 on the back-bar 20. The front edge of the seat is suspended by supports 26 and 27 from the side-bars 13, the connections at both the top and bottom of the supports 26 and 27 being pivotal. Thus the chair 22 is hinged for free movement at the top of its back and the front edge of its seat.

It will now be apparent that as the guns are elevated the back-bar 20 will drop and the seat will be lowered, will tilt backward and move forward thus giving the gunner a true sighting path at all angles of elevation of the guns, affording him perfect sighting facilities without strain or fatigue. It will be further noted that this movement is automatic and does not require him to make any adjustments of the seat or do anything more than manipulate the guns, on which he can concentrate all of his attention.

Furthermore the gunner's weight is supported in part by the back-bar 20 which is rigidly fixed to the arch 14 and forms therewith a ring-like member surrounding the cockpit. This member has a fulcrum in the pivots 15, and, the guns being on one side thereof and the gunner's weight on the other, his weight counterbalances that of the guns and reduces the power which would otherwise be required to elevate them.

In gun rings of the type described the rotary motion of the ring may be controlled by the deflection of the guns, power being applied to produce rotation when the guns are deflected to right or left more than a predetermined amount. This may prove disadvantageous in throwing the gun off a target by the unexpected movement of the ring. This invention therefore contemplates putting the control of the rotating devices for the ring under the direct control of the operator, independent of the guns, and to this end the chair 22 is provided with an integral footrest, comprising the sections c, d and e, which is maintained in the same position relative to the seat of the chair. To this footrest is attached a control box 30, in which may be contained any suitable control for electrical, hydraulic or pneumatic driving gear. Adjacent the fixed footrest d a foot-operated control 31 is mounted, by means of which the operator can positively regulate the rotation of the ring and the coarse deflection of the guns. It is to be understood that the guns are pivoted on the arch 14 so as to permit their deflection through a short arc for fine adjustment. Since the operator is rigidly supported on his seat with his heels spaced apart on the footrest, he is able to attain precise control and great steadiness of aim. He is at all times in the same position relative to his guns and other controls.

It will be apparent to those skilled in the art that the novel features of the present invention may be modified in various ways and adapted for use in conjunction with other apparatus of the type herein described but of different construction. The detailed description of the specification is therefore to be construed as merely illustrative and not as a limitation on the invention which is defined in the appended claims.

What is claimed is:

1. In a mounting for apparatus to be sighted by an operator, a horizontally rotatable framework having a central opening providing a cockpit, apparatus to be sighted which is directed outwardly from said cockpit, an elevating arch pivotally mounted directly on said framework at opposite sides of the cockpit for elevating and supporting said apparatus, said arch extending around the fore part of the cockpit, a back-bar rigidly fixed to said arch and extending around the rear part of the cockpit, an operator's seat supported at its rear from said back-bar and at its front from said framework, whereby the weight of the operator counterbalances the weight carried by said arch.

2. In a gun mounting, a horizontally rotatable framework defining a cockpit, a gun directed outwardly from said cockpit, a gun-elevating arch pivotally mounted directly on said framework at opposite sides of the cockpit for elevating and supporting said gun, said arch extending around the fore part of the cockpit, a back-bar rigidly fixed to said arch and extending around the rear part of the cockpit, a gunner's seat supported at its rear from said back-bar and at its front from said framework, whereby the weight of the gunner counterbalances the weight carried by said arch.

3. In a gun mounting, a horizontally rotatable framework defining a cockpit, a gun directed outwardly from said cockpit, a gun-elevating arch pivotally mounted directly on said framework at opposite sides of the cockpit for elevating and supporting said gun, said arch extending around the fore part of the cockpit, a back-bar rigidly fixed to said arch and extending around the rear part of the cockpit, a gunner's seat located in said cockpit, a pair of supports pivotally secured to spaced points on said back-bar and secured to the rear of said seat, and a second pair of supports pivotally secured to said framework on either side of the cockpit forward of said seat and pivotally secured to the front part of the seat.

HUBERT SCOTT-PAINE.